(12) United States Patent
Xue et al.

(10) Patent No.: US 6,587,273 B2
(45) Date of Patent: Jul. 1, 2003

(54) BEAM SPLITTING DEVICE

(75) Inventors: Meng Xue, Union City, CA (US);
Kok-Wai Chang, Los Altos, CA (US);
Xinglong Wang, San Jose, CA (US);
Lihong Yuchi, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/886,999

(22) Filed: Jun. 25, 2001

(65) Prior Publication Data

US 2003/0002155 A1 Jan. 2, 2003

(51) Int. Cl.[7] .................. G02B 27/10; G02B 27/28; G02B 6/00
(52) U.S. Cl. .................. 359/618; 359/494; 359/495; 385/11
(58) Field of Search ................ 359/618, 496, 359/494, 495; 385/11

(56) References Cited

U.S. PATENT DOCUMENTS

| | | | | | |
|---|---|---|---|---|---|
| 3,628,173 A | * | 12/1971 | Danielmeyer | ................ | 372/20 |
| 4,914,664 A | * | 4/1990 | Woodward | ................... | 372/20 |
| 5,105,307 A | * | 4/1992 | Nishiyama et al. | ......... | 359/484 |
| 5,557,692 A | * | 9/1996 | Pan et al. | ...................... | 385/11 |
| 5,930,038 A | * | 7/1999 | Swan | ......................... | 359/484 |
| 6,246,807 B1 | * | 6/2001 | Lu et al. | ....................... | 385/11 |

* cited by examiner

Primary Examiner—Hung Xuan Dang
Assistant Examiner—David N. Spector
(74) Attorney, Agent, or Firm—Hall, Priddy, Myers & Vande Sande

(57) ABSTRACT

An improved design of beam splitting device is described that is formed by cutting a birefringent material to predetermined dimensions. The beam splitting device resolves input light into mutually orthogonal linearly polarised beams. The mutually orthogonal linearly polarised beams propagate on either side of an axis as defined by the propagation axis of the input light. Such beam splitting devices lends themselves to a reduction in the overall dimensions of an optical system. In particular an optical circulator is described that employs such beam splitting devices so as to allow the transfer of light from a first optical port to a second optical port, and from the second port to a third. Not only does the employment of such beam splitting devices significantly reducing the dimensions of the optical system it also renders the device simpler to align.

23 Claims, 5 Drawing Sheets

BEAM SPLITTING DEVICE

FIELD OF THE INVENTION

The present invention relates to the field of optics and in particular to a polarisation beam splitting device whose incorporation into optical systems that require polarisation beam splitters, can significantly reduce their overall dimensions.

BACKGROUND

Beam splitting devices are commonly used in the field of optics when it is required to separate two spatially overlapping beams of light or two polarised components of a single beam. The prior art teaches of various methods for achieving such a result that employ either blocks of birefringent material, polarisation dependent coatings or other polarisation effects.

When requiring the polarisation components of a light beam to be resolved, the most efficient manner is to employ a block of birefringent material. A birefringent material is one that is optically anisotropic in that the optical properties it exhibits depend upon the polarisation and propagation direction of the incident light. Many crystalline substances, such as rutile, calcite or yttrium orthovanadate, exhibit such birefringent properties and so provide ideal media from which to develop polarisation beam splitting devices. Such crystal structures are so suited for producing compact birefringent medium, as they comprise high-density structures that lend themselves to cutting, so producing incident surfaces and optic axis of the required predetermined orientations. Nicol prisms and Glan-Foucault prisms are examples taught in the prior art of birefringent crystals employed as beam splitters.

Figure 1:
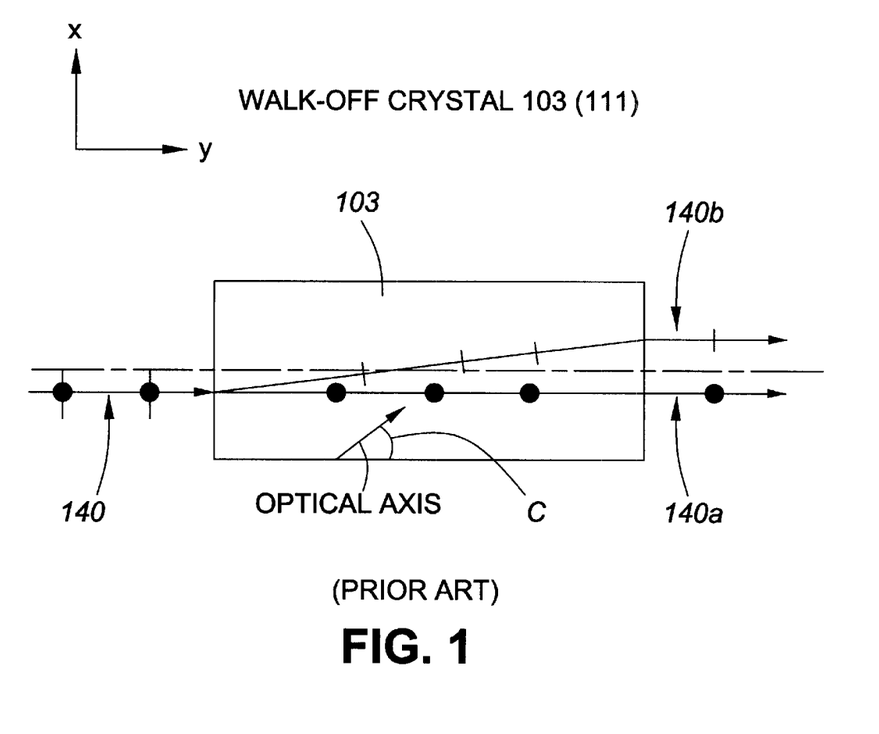
FIG. 1 presents a side elevation of a block of birefringent material as taught in the prior art.

FIG. 1 presents a side elevation of a typical block of birefringent material 103 as taught in the prior art. Here an unpolarised incident beam 140 is incident on the block of birefringent material 103, thereby being resolved into two light beams having orthogonal linear polarisations. For reference a propagation axis L is defined corresponding to the axis of an input beam 140. With this particular orientation, beam 140a corresponds to the ordinary beam while beam 140b corresponds to the extraordinary beam. As is typical in optical systems, components are designed such that where possible input and output faces are perpendicular to the central axis L. Therefore, with the incident beam 140 perpendicular to the block of birefringent material 103 the resulting ordinary beam 140a passes without deviation through the block 103 while the extraordinary beam 140b is refracted as shown.

An inherent disadvantage of such a splitting of the ordinary and extraordinary component beams is that when incorporated into an optical system, such blocks of birefringent material 103 introduce an asymmetric beam splitting. It is normally advantageous for the emerging ordinary 140a and extraordinary beams 140b to be parallel and equidistant from the propagation axis L. The dimensions of the other optical elements of an optical system are then directly dependent on the block of birefringent material 103.

By way of example such blocks of birefringent material 103 are considered herein as incorporated with an optical circulator. However, as will be obvious to those skilled in the art, the problem of reducing the dimensions of an optical system that ernploys such a block of birefringent material 103 as a beam splitter, is not limited solely to optical circulators. Such optical systems also include for example, optical isolators and polarisation beam splitters/combiners.

An optical circulator is a device that has at least three ports for accepting optical fibres. Light that enters the circulator through the first port exits through the second port; light that enters through the second port exits through the third. The optical circulator is an inherently non-reciprocal device. If light enters through the first port it exits through the second, but if that light is subsequently reflected back into the second port, it does not retrace its path back to the first port, but exits through the third port instead.

Circulators are necessary, for example, to use the same fibre for both receiving and transmitting data. The first port may be connected to a data transmitter, and the second port to a long distance optical fibre. In that case, data can be sent from the transmitter to the fibre. At the same time, incoming optical data from the long distance fibre enters the circulator through the second port and is directed to the third port where a receiver may be connected.

An optical circulator found in the prior art is that taught by Li et al in U.S. Pat. No. 5,930,039, see FIG. 2, the contents of which are incorporated herein by reference.

Figure 2:
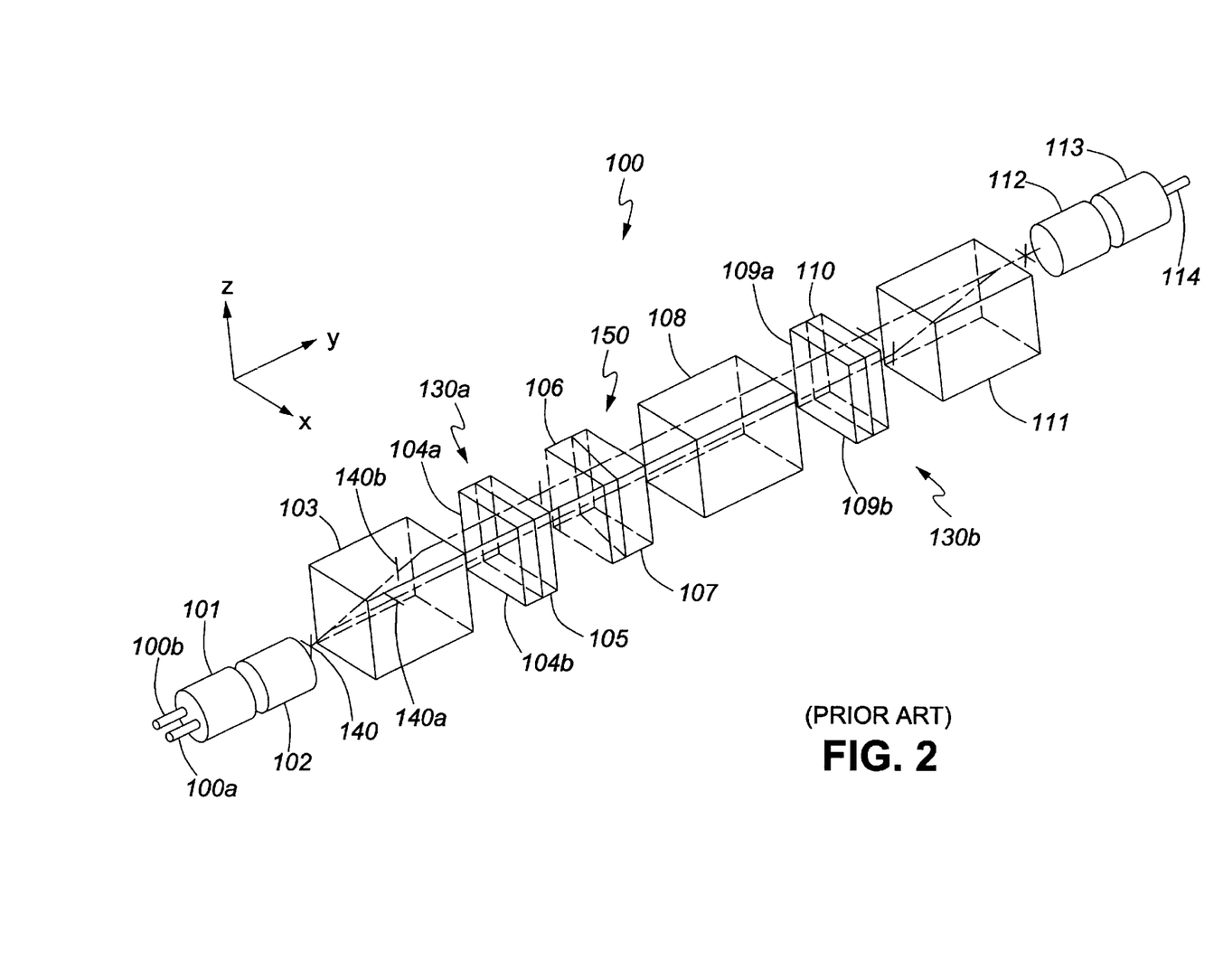
FIG. 2 shows a prior art optical circulator by Li et al, the contents of which are incorporated herein by reference, incorporating blocks of birefringent material as described in FIG. 1.

This document teaches of an optical circulator 100 that employs reciprocal and non-reciprocal polarisation rotators 130a and 130b, birefringent optical components 103, 108 and 111, and a polarisation dependent refraction element 150 comprising of two tapered birefringent plates 106 and 107. In the preferred embodiment the optical circulator 100 has its optical components aligned such that effects of the birefringent optical components occur in the vertical plane while the effects of the polarisation dependent refraction element occur in the horizontal plane.

The first and third fibres 100a and 100b are inserted in parallel and adjacent to each other into a glass capillary 101 which is followed by a first lens 102. Together the glass capillary 101 and the lens 102 comprise a first collimator 120a. A first block of birefringent material 103, a first compound polarisation rotator 130a, a light guiding device 150, a second birefringent block 108, a second compound polarisation rotator 130b and a third block of birefringent material 111 are then located along a longitudinal axis L of circulator 100. A second collimator 120b comprising a second lens 112 and a second glass capillary 113 which holds the second fibre 114 are found at the opposite end of device 100.

Figure 3A:
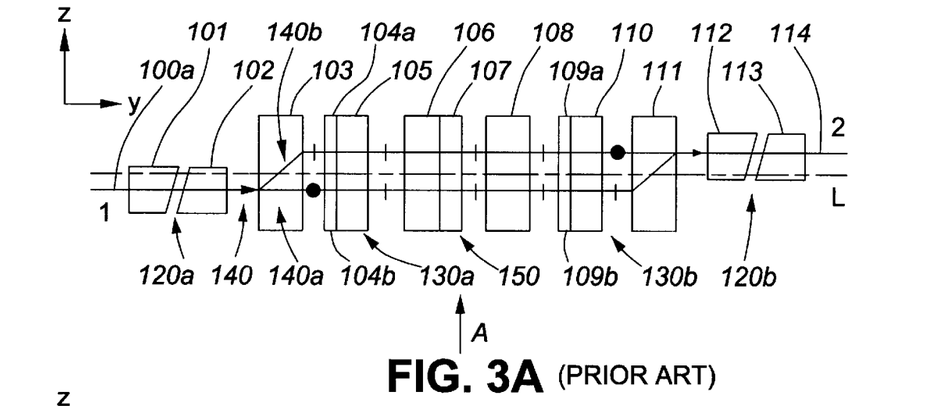

FIG. 3 provides alternative elevations of the optical circulator 100. In particular FIG. 3a presents a side profile of the circulator 100 presenting light propagating in the z-y plane from the first fibre 100a to the second fibre 114. Initially the light propagates through the first lens 102 and into the first birefringent block 103 Walk off within the block 103 in the z-y plane then produces two mutually orthogonal linearly polarised beams, 140a and 140b, as shown. These linearly polarised beams 140a and 140b then propagate through the first compound polarisation rotator 130a before continuing on through the optical circulator 100 until they are recombined by the third birefringent block 111 and focused by second lens 113 into second the fibre 114.

Figure 3B:
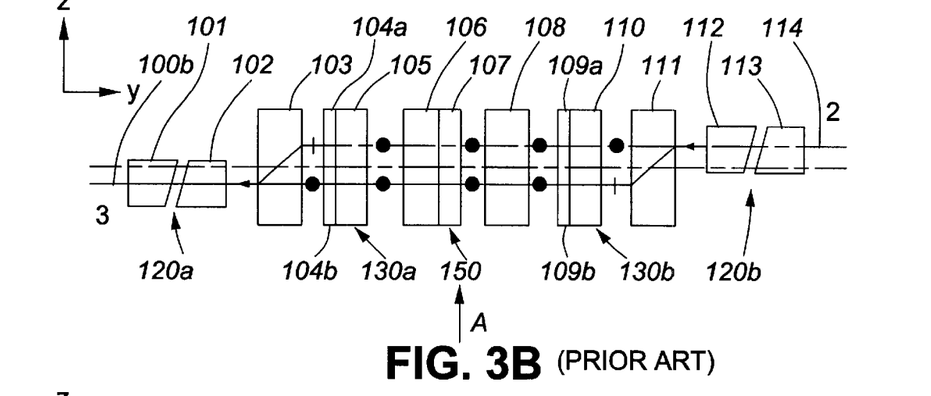

For the optical circulator 100 to work correctly it requires that any light entering the device at the second fibre 114 exits the optical circulator 100 via the third fibre 100b, and not via the first fibre 100a. The non-reciprocal nature of the device lies in the inherent properties of the compound polarisation rotators 130a and 130b. To illustrate these features FIG. 3b presents a side profile in the z-y plane of the circulator 100 presenting light propagating from the second fibre 114 to the third fibre 100b.

Comparison of the orientations of the linearly polarised electric field components after propagating through the compound polarisation rotators 130a and 130b shows how the polarisation orientation of an electric field depends on which direction it has propagated through the compound polarisation rotators 130a and 130b. The origin of this non-reciprocity lies in the inherent properties of the Faraday rotators 105 and 110. Unlike the half wave plates 104a, 104b, 109a and 109b which reverse the rotation experienced by a linearly polarised electric field on reversal of its propagation direction, a Faraday rotator is designed to always rotate a linearly polarised electric field in the same sense irrespective of propagation direction.

Figure 3C:
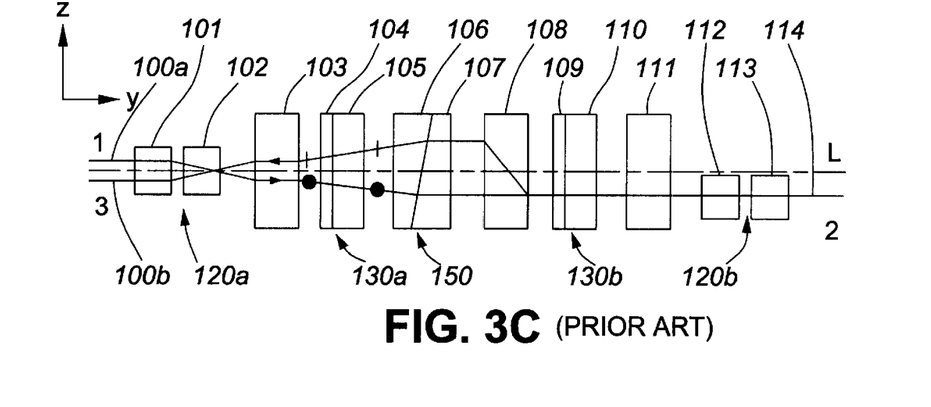

FIG. 3c shows the x-y plane profile of light propagating from the first fibre 100a to the second 114, along with that propagating from the second fibre 114 to the third 100b. Initially the light beam from the first fibre exits the first lens 102 at an angle □ to the x-axis. On exiting the compound rotator 130a each of the linearly polarised beams, 140a and 140b propagate at an angle □ relative to the x-axis. The angle of propagation of each of these components is then altered by the light guiding device that exhibits extraordinary refractive index $n_e$ and an ordinary refractive index $n_o$, where $n_o > n_e$.

Tapered plate 106 has an optic axis OA1 that is orientated parallel to the z-axis while tapered plate 107 has an optic axis OA2 parallel to the x-axis. This results in both electric field components of the beams 140a and 140b exiting the light guiding device 150 parallel to the y-axis.

The second block of birefringent material 108 has an optical axis that is also orientated parallel to the z-axis. Therefore, the electric field components of the beams 140a and 140b are both orientated as ordinary rays relative to the birefringent block 108 and so propagate undeviated through it.

The situation is somewhat different in the x-y plane when considering light propagating from the second fibre 114 to the third 100b. The non-reciprocal nature of the compound polarisation rotators 130a and 130b is employed by the light guiding device 150 and the second birefringent block 108 in order to translate light from the second fibre 114 to the third 100b. Before entering the second birefringent block 108 the two electric field components of the light beams are linearly polarised parallel to the z-axis and therefore the beams 140a and 140b act as extraordinary rays within the second birefringent block 108. This results in them being spatially translated along the x-axis before propagating through the light guiding device 150. Translation through the light guiding device 150 imposes an angle φ□ between the linear polarised beams of light and the y-axis. The light then continues on through the optical components being recombined by the first birefringent block 103 before being focused by the first lens 102 into the third fibre 100b.

Analysis of FIG. 3 highlights the inherent disadvantage of employing traditional blocks of birefringent material within this optical circulator 100. It is seen that the collimators 120a and 120b are spatially displaced along both the x and z-axes. The result of such an offset in the collimators 120a and 120b is two fold. In the first instance it makes the optical circulator 100 more difficult to align than if the collimators shared a common axis. Secondly, it restricts the minimum dimensions available for the device. Since cost is directly related to the dimensions of an optical component the offset of the collimators adds additional cost to the manufacture of such an optical system.

By redesigning the blocks of birefringent material such that the optical circulator has its collimating elements on a common longitudinal axes the elements of an optical circulator can be made smaller, thus the entire optical circulator is cheaper and easier to manufacture as well as being simpler to align.

OBJECTS AND SUMMARY OF THE INVENTION

In view of the above, it is an object of the present invention to provide a polarisation beam splitting device formed from a block of birefringent material. The beam splitting device resolves a randomly polarised input beam of light into ordinary and extraordinary linearly polarised beam components that propagate symmetrically about an axis as defined by the input beam.

It is a further object of the present invention to provide a compact and economical optical system that employs the aforementioned beam splitting device, such that all the optical elements of the system share a common longitudinal axis.

BRIEF DESCRIPTION OF THE DRAWING

FIG. 3 presents elevations of the optical circulator of FIG. 2, and in particular presents:

(a) a side view showing how light is transmitted from a first optical fibre to a second optical fibre;

(b) a side view showing how light is transmitted from the second optical fibre to a third optical fibre; and (c) the elevation, as seen from A in FIGS. 3a and 3b, showing how light propagates around the circulator.

FIG. 4 presents a side elevation of:

(a) a first embodiment of the beam splitting device according to the present invention; and (b) a second embodiment of the beam splitting device according to the present invention.

FIG. 5 presents elevations of an optical circulator incorporating the beam splitting devices of FIG. 4, and in particular presents:

(a) a side view showing how light is transmitted from a first optical fibre to a second optical fibre;

(b) a side view showing how light is transmitted from the second optical fibre to a third optical fibre; and (c) the elevation, as seen from A in FIGS. 5a and 5b, showing how light propagates around the circulator.

DETAILED DESCRIPTION OF THE INVENTION

In order to reduce the dimensions of an optical system it is required to have a beam splitting device that provides ordinary and extraordinary output beam components from an input beam, that propagate symmetrically about an axis as defined by the input beam. FIG. 4 presents side elevations of two embodiments of such a beam splitting device that achieves this desired effect.

In both Figures light is shown propagating along the y-axis through a birefringent material in the form of crystal structures. The desired symmetry of the ordinary and extraordinary component beams is achieved in the embodiment shown in FIG. 4(a) by cutting the input and output faces of the beam splitting device 203. The critical factors resulting from the cut are the angles A and B. The angle A lies in the z-y plane and refers to the angle of the front face of the crystal relative to the propagation axis L, as defined by the input beam 240. The angle B lies in the x-y plane and refers to the angle between the optic axis and the propagation axis L.

Figure 4A:
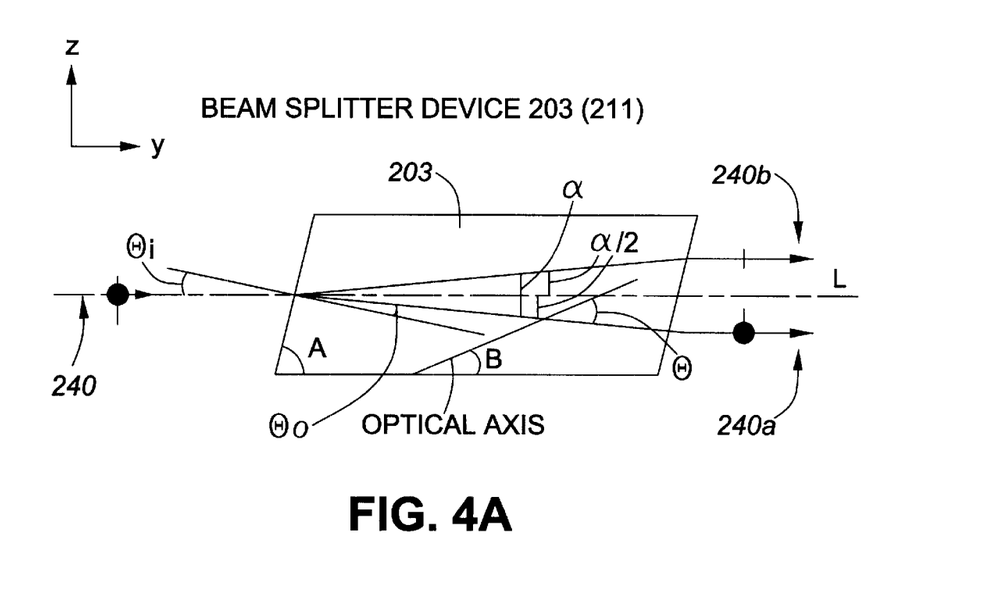

The angles A and B are defined by the inherent properties of the material from which the beam splitting device 203 is cut. Consideration of Snell's Law and the equation of the index ellipsoid provides the following expressions for the angles A and B, namely:

$$A = 90° - \theta_i \quad (1)$$

$$B = \theta - \frac{\alpha}{2} \quad (2)$$

which can be calculated with the aid of the following equations:

$$\tan\theta = \frac{n_e}{n_o} \quad (3)$$

$$\tan\alpha = \frac{n_e^2 - n_o^2}{2 n_o n_e} \quad (4)$$

$$\sin\theta_i = n_o \sin\theta_o \quad (5)$$

$$\theta_o = \theta_i - \frac{\alpha}{2} \quad (6)$$

where $\theta_i$—angle of incidence of input beam 240

$\theta_o$—angle of refraction of the ordinary component 240a $\alpha$—angle between the ordinary and extraordinary component 240a and 240b, respectively $\theta$—angle between the ordinary component 240a and the optic axis $n_e$—refractive index experienced by the extraordinary component 240b $n_o$—refractive index experienced by the ordinary component 240b In the present embodiment the crystal material is formed from Yttrium Vanadate ($YVO_4$) that exhibits $n_o=1.945$ and $n_e=2.149$. Therefore, substitution of these values in equations (1)–(6) provides that the required angles A and B take the values 84.1° and 45.0°, respectively.

With this design of the beam splitting device 203 the input beam 240 propagates along the axis L. The input beam 240 is therefore not perpendicularly incident on the beam splitting device 203 and so the ordinary beam 240a is refracted to a plane below the axis L. Also as a result of the non-perpendicular angle of incidence of the input beam 240 the extraordinary beam 240b does not experience the same level of refraction relative to the axis L as was the case for the extraordinary beam 140b in the prior art teachings of FIG. 1.

Figure 4B:
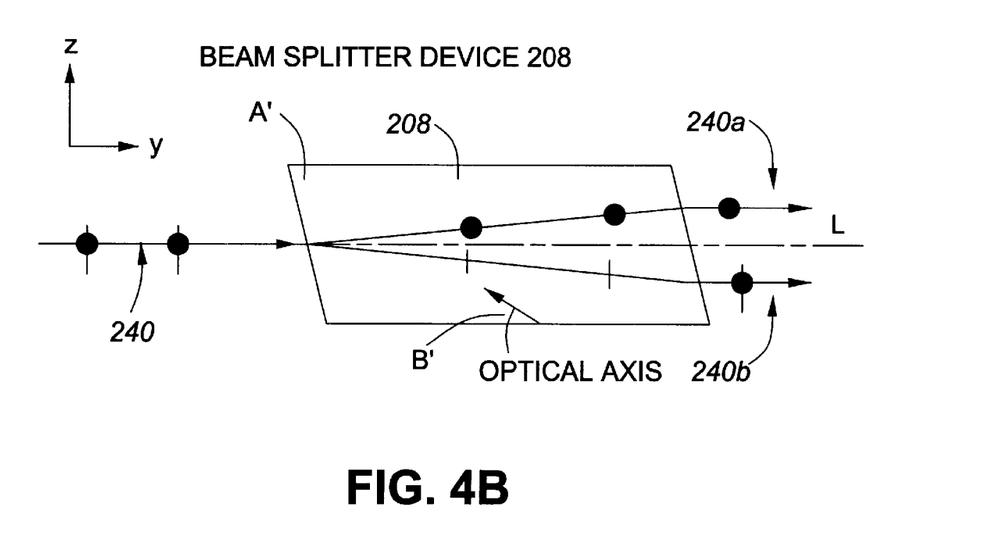

It should be noted that an alternative cut of the block of the beam splitting device 208 results in a mirror image for the ordinary 240a and extraordinary 240b beams being produced, relative to the case in FIG. 4a. FIG. 4b shows the critical angles A' and B' required such that the ordinary 240a and extraordinary 240b beams emerge from the beam splitting device 208 on alternative sides of the propagation axis L from the case shown in FIG. 4a.

In order to highlight the advantages of the beam splitting devices 203 and 208, FIG. 5 presents a more compact and economical optical circulator 200 based on the teachings of Li et al. Alternative profiles of the optical circulator 200 are presented and show that it comprises of: three optical fibres 200a 214 and 200b, two collimators 220a and 220b, three beam splitting devices 203, 208 and 211, two compound polarisation rotators 230a and 230b and a light guiding device 250. It should be noted at that the third beam splitting device 211 operates in a similar fashion to that outlined above for the first beam splitting device 203.

To aid this description a set of orthogonal reference axes is arranged such that the y-axis is substantially parallel to the three fibres 200a, 200b and 214.

All but the beam splitting devices 203, 208 and 211 are as described in the teachings of Li et al. The collimators 220a and 220b comprise a glass capillary 201 and 213, employed to mount the optical fibres and a GRIN lens 202 and 212, respectively. Each compound polarisation rotator 230a and 230b comprise two half wave plates (204a, 204b 209a and 209b respectively) and a Faraday rotator (205 and 210 respectively). The light guiding device 250 comprises two tapered birefringent plates 206 and 207. The tapering of plate 206 is complementary to the tapering of plate 207, each having a tapered angle □. In this embodiment plate 206 has an optic axis OA1 that is orientated parallel to the z-axis while plate 207 has an optic axis OA2 that is orientated parallel to the x-axis. Both plates 206 and 207 are made from the same birefringent material exhibiting ordinary ($n_o$) and extraordinary ($n_e$) refractive indices such that $n_o > n_e$.

It should be immediately apparent by comparing FIG. 3 and FIG. 5 that the optical circulator 200 has all of the aforementioned optical components substantially coaxial about a single axis L that lies parallel to the y-axis. However unlike the teachings of Li et al the second optical fibre 214 now also lies on the axis L, while the first 200a and third 200b fibres lie in a common plane with the this axis. In the teachings of Li et al this is not the case. It is an inherent property of that system that both the collimating elements 101 and 103 are displaced relative to each other along both the x-axis and the z-axis. The more compact design of the present optical circulator 200 is a direct result of the design of the beam splitting devices 203, 208 and 211.

Figure 5A:
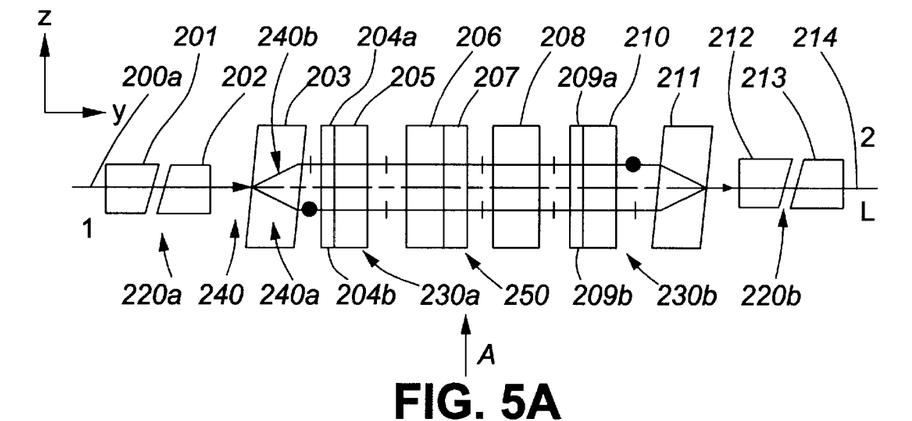

FIG. 5a presents a side profile of the optical circulator 200 presenting light propagating in the z-y plane from the first fibre 200a to the second fibre 214. Initially the input light 240 propagates along the central axis L through the first lens 202 and into the first beam splitting device 203. The beam splitting device 203 then resolves the input light 240 into two beams with perpendicular linear polarisation as described above, namely an ordinary beam 240a (parallel to the x-axis) and an extraordinary beam 240b (parallel to the z-axis). The beams 240a and 240b emerge from the beam splitting device 203 parallel and equidistant from the axis L.

The linearly polarised electric field components 240a and 240b then propagate through the first compound polarisation rotator 230a that acts to rotate the linearly polarised beam 240b so as to be parallel the x-axis. The linearly polarised beams 240a and 240b then propagate undeviated through the light guiding device 250 and the second beam splitting device 208 due to the orientation of their polarisation relative to the optic axes of these optical components. The second compound polarisation rotator 230b then acts to rotate the linearly beam 240a so as to be parallel the z-axis. At this stage both the linearly polarised beams 240a and 240b are orientated in the correct sense so as to be recombined by the third beam splitting device 211. On propagating through the third beam splitting device 211 the light is recombined so as to propagate parallel to the axis L, thereafter being focused by the second lens 212 into the second fibre 214. It is the design of the first and third beam splitting devices 203 and 211 that overcomes the problem of the spatial offset along the z-axis of the collimators.

Figure 5B:
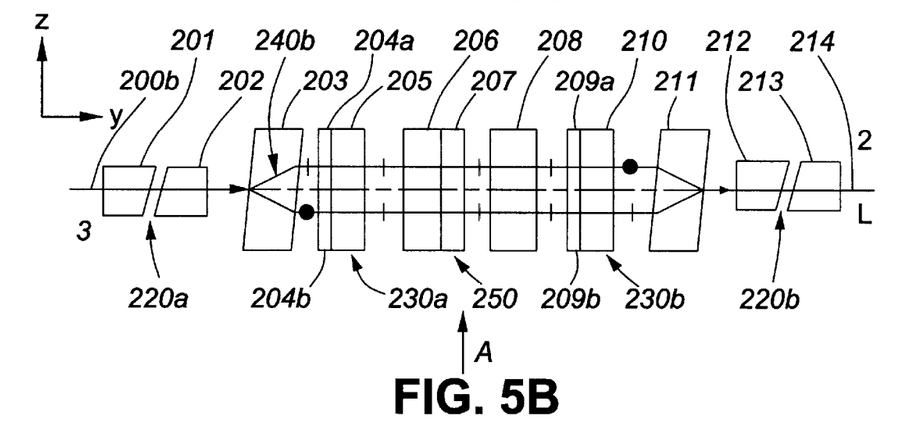

The non-reciprocal nature of the device is illustrated in FIG. 5b and again lies in the inherent properties of the compound polarisation rotators 230a and 230b. FIG. 5b presents a side profile in the z-y plane of the circulator 200 presenting light propagating from the second fibre 214 to the third fibre 200b. As in the prior art, the non-reciprocal nature of the device can be observed by comparing the orientation of polarisation of the linearly polarised beams as they propagate through the optical circulator 200 with those in FIG. 3a.

As with the teachings of Li et al, this inherent non-reciprocal nature of the optical circulator 200 is what is employed in order to guide light entering the device from the second fibre 214 so as to exit via the third 200b. It is again the combination of the input angles, the light guiding device 250 and the first and second beam splitting devices 203 and 208 that appropriately orientates the propagation angle of the light in the x-y plane so as to arrive at the required fibres.

The design of the second beam splitting device 208 overcomes the problem of the spatial offset along the x-axis of the collimators. This is outlined in FIG. 5c where the x-y plane profile of light propagating from the first fibre 200a to the second 214, along with that propagating from the second fibre 214 to the third 200b is presented.

Figure 5C:
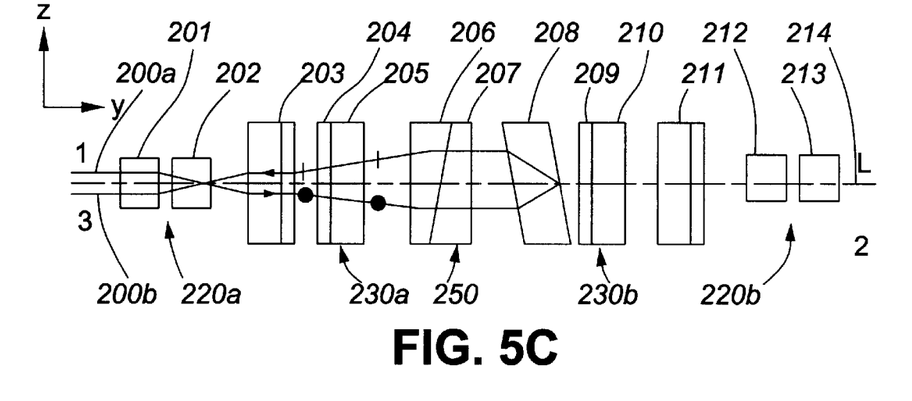

As with the teachings of Li et al a light beam from the first fibre 240 exits the first lens 202 at an angle $\square$ to the x-axis. On exiting the compound rotator 230a both the linearly beams, 240a and 240b propagate at an angle $\square$ relative to the x-axis. The angle of propagation of each of these beams is then altered by the light guiding device 250 that exhibits extraordinary refractive index $n_e$, and an ordinary refractive index $n_o$, where $n_o > n_e$. Tapered plate 206 has an optic axis OA1 that is orientated parallel to the z-axis while tapered plate 207 has an optic axis OA2 parallel to the x-axis. The result is that each beam exits the light guiding device 250 parallel to the y-axis. The beam splitting device 208 has an optic axis that is also orientated parallel to the z-axis, therefore the linear polarised beams 240a and 240b are ordinary rays relative to the beam splitting device 208. However, due to the cut of the beam splitting device 208 both of these beams experience refraction such that they exit propagating along the axis L. The linear polarised beams 240a and 240b then propagate through the optical circulator 200 as previously describe exiting via the second fibre 214.

A similar situation exists in the x-y plane when considering light propagating from the second fibre 214 to the third 200b. The non-reciprocal nature of the compound polarisation rotators 230b is employed by the light guiding 250 device and the second beam splitting device 208 in order to translate light from the second fibre 214 to the third 200b.

Before entering the beam splitting device 208 the two beams of the light beam are linearly polarised parallel to the z-axis and therefore act as extraordinary rays within the second beam splitting device 208. This results in them being spatially translated along the x-axis before propagating through the light guiding device 250. Translation through the light guiding device imposes an angle $\phi\square$ between the linear polarised beams of the light beam and the y-axis. The light then continues on through the optical components being recombined by the first beam splitting device 203 before being focused by the first lens 202 into the third fibre 200b.

In a broad sense, the cutting of a block of birefringent material to predetermined characteristics provides a beam splitting device that symmetrically splits linearly polarised ordinary and extraordinary components about an axis as defined by the unpolarised input beam. Incorporating such beam splitting elements in an optical system provides a way of reducing the overall dimensions of the system since this allows all the optical components to share on one common longitudinal axis. These features also make optical systems easier to align.

It will be apparent to a person of average skill in the art that variations of the beam splitting devices are possible within the scope of the invention. Also the incorporation of beam splitting devices in an optical system is not restricted solely to the field of optical circulators. Accordingly, the following claims and their legal equivalents should determine the scope of the invention.

Teachings of Li et al
100 Optical Circulator
100a—First Fibre
100b—Third Fibre
101—First Glass Capillary
102—First Lens
103—First Block of Birefringent Material
130a—First Compound Polarisation Rotator
104a—Half wave Plate
104b—Half Wave Plate
105—Faraday Rotator
150—Light Guiding Device
108—Second Block of Birefringent Material
130b—Second Compound Polarisation Rotator
109a—Half wave Plate
109b—HalfWave Plate
110—Faraday Rotator
111—Third Block of Birefringent Material
112—Second Lens
113—Second Glass Capillary
114—Second Fibre
140—First Light Field
According to the Present Invention
200 Optical Circulator
200a—First Fibre
200b—Third Fibre
220a—First Collimator
201—First Glass Capillary
202—First Lens
203—First Beam Splitting Device
230a—First Compound Polarisation Rotator
204a—Half wave Plate
204b—Half Wave Plate
205—Faraday Rotator
250—Light Guiding Device
206—First tapered Plate
207—Second tapered Plate
208—Second Beam Splitting Device
230b—Second Compound Polarisation Rotator
209a—Half wave Plate
209b—Half Wave Plate
210—Faraday Rotator
211—Third Beam Splitting Device
220b—Second Collimator
212—Second Lens
213—Second Glass Capillary
214—Second Fibre 240—First Light Field
240A—Ordinary Component of First Light Field

We claim:

1. An optical birefringent device comprising a block of birefringent material, said block of birefringent material having an input face and an opposite output face parallel to the input face, the block having an optical axis, the input face and the output face being disposed at a non-perpendicular angle to a propagation axis defined by the propagation direction of an input optical beam, while the optical axis is disposed at a second predetermined angle to the propagation axis, the incidence angle and the second angle being both selected such that the input optical beam entering said birefringent block is separated into first and second beams with mutually orthogonal linear polarisations, said first and second beams being propagated so as to be located on opposite sides of said propagation axis.

2. The optical birefringent device according to claim 1 wherein said birefringent material comprises a crystal structure having a face on which the said light beams are incident, cut at an angle dependent on the orientation of the crystal's optic axis, such that said light beams are non-perpendicularly incident on said incident face.

3. The optical birefringent device according to claim 1 wherein said birefringent material comprises a crystal structure having a second face located opposite to the said incident face, cut at an angle dependent on the orientation of the crystal's optical axis, such that said light beams are non-perpendicularly incident on said opposite face.

4. An optical system comprising the optical birefringent device of claim 1.

5. An optical system according to claim 4 and comprising a plurality of optical elements wherein said optical elements are located on said propagation axis.

6. An optical circulator for coupling a first light sending port, a second light sending and receiving port and a third light receiving port, said circulator having a longitudinal axis along which there is located a plurality of elements comprising:

a) a first optical birefringent device for receiving light from said first port, guiding light to said second port, and for separating and combining mutually orthogonal polarised beams;

b) a first polarisation rotator for changing the polarisation of beams from mutually orthogonal to parallel and from parallel to mutually orthogonal;

c) means for bending collimated light at an angle dependent upon its direction of polarisation;

d) a second optical birefringent device for guiding light to and receiving light from said second port, and for combining and separating mutually orthogonal polarised beams; and       wherein said optical birefringent devices each have an associated propagation axis defined by the propagation direction of the combined light, an input face and an opposite output face parallel to each other and disposed non-perpendicularly to the propagation axis at an angle dependent on the orientation of optical axis of the respective birefringent device, said angle being selected so as to propagate said separated beams on opposite sides of said propagation axis.

7. The optical circulator according to claim 6 wherein the second light sending and receiving port is located on the said propagation axis.

8. The optical circulator according to claim 6 wherein the first light sending port and the third light receiving port are located on a plane on which the said propagation axis lies.

9. The optical circulator according to claim 6 wherein the said first and second optical birefringent devices comprise crystal structures having first and second mutually parallel faces cut at an angle dependent on the orientation of the crystal's optic axis, such that said light beams are non-perpendicularly incident on said first or second mutually parallel faces.

10. The optical circulator according to claim 6 wherein said first compound polarisation rotator comprises first and second reciprocal polarisation rotators and a first non-reciprocal polarisation rotator.

11. The optical circulator according to claim 6 wherein the said means for bending collimated light comprises first and second birefringent plates located proximal to said propagation axis.

12. The optical circulator according to claim 11 wherein said first and second birefringent plates each include a first and second face, each first and second face being orientated at an angle one to the other, and wherein said second face of said first birefringent plate is mated to said first face of said second birefringent plate.

13. The optical circulator according to claim 6 wherein light enters said means for bending light at a first angle and exits said means for bending light at a second angle different from the first.

14. The optical circulator according to claim 6 further comprising a second compound polarisation rotator located on the propagation axis and interposed between said means for bending light and said second optical birefringent device, wherein the said second compound polarisation rotator comprises third and fourth reciprocal polarisation rotators and a second non-reciprocal polarisation rotator.

15. The optical circulator according to claim 6 further comprising a third optical birefringent device located on the propagation axis and interposed between said means for bending light and said second port.

16. The optical circulator according to claim 6 further comprising a first single lens located on the propagation axis and interposed between said first port and said means for bending light and further interposed between said means for bending light and said third port.

17. The optical circulator according to claim 16 wherein said first single lens is further interposed between said first port and said first optical birefringent device and interposed between said first optical birefringent device and said third port.

18. The optical circulator according to claim 6 further comprising a second single lens located on the propagation axis and interposed between said means for bending light and said second port.

19. The optical circulator according to claim 18 wherein said second single lens is further interposed between said second optical birefringent device and said second port.

20. The optical device of claim 1 wherein the first and second beams are parallel to each other and to the propagation axis after exiting through the output face.

21. The device of claim 20 wherein the first and second beams are equidistant to the propagation axis after exiting through the output face.

22. The optical circulator of claim 6 wherein the first and second beams are parallel to the propagation axis after exiting through the output face.

23. The optical circulator of claim 22 wherein the first and second beams are equidistant to the propagation axis after exiting through the output face.

* * * * *

UNITED STATES PATENT AND TRADEMARK OFFICE
CERTIFICATE OF CORRECTION

PATENT NO.    : 6,587,273 B2
DATED         : July 1, 2003
INVENTOR(S)   : Xue et al.

It is certified that error appears in the above-identified patent and that said Letters Patent is hereby corrected as shown below:

<u>Title page,</u>
Item [75], Inventor's name "Kok-Wal Chang" should read -- Kok-Wai Chang --

<u>Column 3,</u>
Lines 16 and 18, "at an angle □" should read -- at an angle $\theta$ --

<u>Column 6,</u>
Line 27, "a tapered angle □" should read -- a tapered angle $\alpha$ --

<u>Column 7,</u>
Line 34, "at an angle □ to" should read -- at an angle $\theta$ to --
Line 36, "at an angle □ relative to" should read -- at an angle $\theta$ relative to --

<u>Column 9,</u>
Line 3, insert -- 240B-Extraordinary Component of First Light Field --

Signed and Sealed this

Third Day of February, 2004

JON W. DUDAS
*Acting Director of the United States Patent and Trademark Office*